United States Patent [19]
Yoneda et al.

[11] Patent Number: 6,103,996
[45] Date of Patent: Aug. 15, 2000

[54] METHOD FOR PRODUCING A FUEL ROD

[75] Inventors: Eiji Yoneda, Naka-gun; Mitsuteru Sugano, Kobe, both of Japan

[73] Assignee: Mitsubishi Nuclear Fuel Co., Ltd., Naka-gun, Japan

[21] Appl. No.: 09/283,869

[22] Filed: Apr. 1, 1999

[30] Foreign Application Priority Data

Apr. 27, 1998 [JP] Japan ................................. 10-117596

[51] Int. Cl.⁷ ................................................. B23K 9/167
[52] U.S. Cl. ................ 219/137 PS; 219/61; 219/125.11; 219/130.5
[58] Field of Search .......................... 219/137 PS, 137 R, 219/137 WM, 125.11, 130.5, 61, 75

[56] References Cited

U.S. PATENT DOCUMENTS

| | | | |
|---|---|---|---|
| 3,592,997 | 7/1971 | Durie | 219/61 |
| 4,511,075 | 4/1985 | Yeo | 219/75 |
| 4,918,287 | 4/1990 | Yeo | 219/137 PS |
| 5,912,935 | 6/1999 | Isobe et al. | 219/137 WM |

FOREIGN PATENT DOCUMENTS 46-6171  2/1971  Japan ................................. 219/137 R

*Primary Examiner*—Clifford C. Shaw
*Attorney, Agent, or Firm*—Oblon, Spivak, McClelland, Maier & Neustadt, P.C.

[57] ABSTRACT

A method for manufacturing a fuel rod of the present invention includes a welding step of welding a cladding tube of said fuel rod to a plug by arc discharge; and a post welding step of subsequently discharging an arc to a welded portion by a predetermined arc current lower than that of the welding step. In the welding step and in the post welding step, the cladding tube and the plug are rotated with respect to an electrode for discharging the arc. The rotation speed of the cladding tube and the plug in the post welding step is higher than that in the welding step.

14 Claims, 5 Drawing Sheets

METHOD FOR PRODUCING A FUEL ROD

FIELD OF THE INVENTION

The present invention relates to a method for producing a fuel rod used in a reactor with a plug.

This application is based on Japanese Patent Application No. Hei 10-117596, the contents of which are incorporated herein by reference.

BACKGROUND ART

FIG. 4 shows a fuel rod which is a nuclear fuel assembly used in, for example, a light water reactor. In the fuel rod, fuel pellets 3 such as $UO_2$ are inserted into a cladding tube 2 made of zircaloy and are urged by a plenum spring 4, and the plugs 5 and 6 are welded at both ends of the cladding tube 2 by a TIG welding process.

Because of the TIG welding process to weld the plugs 5 and 6 to the cladding tube 2, heat affected zones with widths of approximately 2 mm are formed on both sides of the beads at the welded portions M. When the tube is quenched naturally after completion of the welding process, the heat affected zones are cooled down, in general, at a rate of approximately 100° C./sec.

Before the welding process, the cladding tube 2 originally has a working-affected structure while the plugs 5 and 6 originally have structures of equiaxed grains. The TIG welding causes formation of the beads 7 and the heat affected zones 8 which have affected structures. The beads 7 have a fine needle-like grain structure caused by rapid quenching. The heat affected zones 8 have a structure of both equiaxed grains and needle-like grains, which is caused by rapid quenching from the high temperature at which a beta phase (b.c.c.) or both a beta phase and an alpha phase, which are stable zirconium phases at a relatively high temperature, are exhibited.

As the importance of nuclear power generation for a electric power supply sources have recently increased, improvement of the economical efficiency and operation efficiency of light water reactors have been increasingly demanded. To achieve these objects, the frequency of exchanging fuel rods must be reduced by enhancing the corrosion resistance of the fuel rods. A cladding tube of Zircaloy containing Nb and Fe, which improves the corrosion resistance as compared with prior Zircaloys, has been proposed. The improved Zircaloy is a zirconium alloy which has a composition of 0.6 to 2.0 weight percent Nb, 0.5 to 1.5 weight percent Sn, 0.05 to 0.3 weight percent Fe, and the remainder of Zr and unavoidable impurities.

The cladding tube 2 of the zirconium alloy containing Nb and Fe, disclosed in Japanese Patent Application, First Publication No. Hei 10-54891, improves the corrosion resistance as compared with prior cladding tubes containing the Zircaloy-2 (JIS H4751ZrNT802D) and Zircaloy-4(JIS H4751ZrNT804D).

When the cladding tube of the zirconium alloy containing Nb and Fe is welded in a TIG process, Nb and Fe are segregated at grain boundaries 11 of equiaxed grains 9 and needle-like grains 10 as shown in FIG. 5, so that at the grain boundaries 11 Nb is 3.5 weight percent and Fe is 0.6 weight percent.

At the heat affected zone 8 of the welded portion M, the cladding tube 2 of the zirconium alloy containing Nb and Fe may have inferior corrosion resistance to the cladding tube of Zircaloy-2 or Zircaloy-4.

To estimate the in-reactor corrosion rate, an autoclave test under a temperature of 360° C. and a pressure of approximately 190 atmospheres is, in general, used.

In the autoclave test for the cladding tube 2 of zirconium alloy containing Nb and Fe, it has been found that the heat affected zones 8 of the bead 7 and the plug are coated with a black oxide film, while the heat affected zone 8 of the thin cladding tube is coated with a white oxide film which does not influence the corrosion resistance. The oxide films are subject to accelerated corrosion which leads to shortening their life.

The Japanese Patent Application, First Publication No. Hei 10-54891, teaches that, by cooling down heat affected zones 8 of the cladding tube of zirconium alloy containing Nb and Fe at a rate of 70° C./sec. to 5° C./sec. after the TIG welding process, the segregation of Nb and Fe at the grain boundaries 11 of the heat affected zone 8 is enhanced so that the heat affected zone 8 contains 4.0 to 30 weight percent Nb and 0.9 to 20 weight percent Fe, preventing occurrence of the white oxide film at the heat affected zone 8 and enhancing the corrosion resistance.

As a result of cooling the heat affected zone 8 at a temperature reduction rate exceeding 70° C./sec., the heat affected zone 8 will contain Nb in amounts below 4 weight percent and Fe in amounts below 0.9 weight percent at the grain boundaries 11, and will have poor corrosion resistance. Even when the temperature reduction rate at the heat affected zone 8 is below 5° C./sec., it is impossible to enhance the Nb content to above 30 weight percent and the Fe content to above 20 weight percent, which leads to a decrease in the strength of the fuel rod instead of an improvement of the corrosion resistance.

To adjust the temperature reduction rate to the range of 70° C./sec. to 5° C./sec. at the heat affected zone 8 after the TIG welding process, the following methods can be employed: (1) control to reduce the flow rate of a cooling gas provided to a welded portion M, (2) removing a chiller metal used to cool the welded portion M, and (3) a heat treatment step for heating the welded portion M by a heater after the welding step (using induction heating or directly applying a current). When methods (1) and (2) are employed, corrosion resistance cannot be improved because the temperature reduction rate remains high. In the method (3), corrosion resistance can be improved because the temperature is appropriately controlled, but installation of another device is needed, increasing the installation and running costs.

SUMMARY OF THE INVENTION

It is therefore an object of the present invention to provide a method for producing a fuel rod with a heat treatment process which improves corrosion resistance and reduces costs.

In order to accomplish the above object, the method for manufacturing a fuel rod according to the present invention, comprises: a welding step of welding a cladding tube of the fuel rod to a plug by arc discharge; and a post welding step of subsequently discharging an arc to a welded portion by a predetermined arc current lower than that of the welding step.

According to the present invention, by discharging an arc with a relatively low arc current after the welding step, the temperature reduction rate at the welded portion can be appropriately reduced to the range of 70° C./sec. to 5° C./sec. without any independent heater, and the corrosion resistance at the welded portion which includes a heat affected zone can be improved.

Preferably, in the welding step and in the post welding step, the cladding tube and the plug are rotated with respect to the arc discharge electrode. The rotation speed of the cladding tube and the plug in the post welding step is higher than that in the welding step.

In the post welding step, the cladding tube is rotated at the relatively high speed, making the temperature uniform at the arc-discharged point and other circumferential areas near the welded portion and making the temperature reduction rates uniform throughout the circumference of the welded portion, so that corrosion resistance can be improved.

Preferably, in the post welding step, the arc current value is in a range of 1 to 10 A, the rotation speed of the cladding tube and the plug is above 30 rpm, and the temperature reduction rate is in a range of 70° C./sec. to 5° C./sec. The welding step is performed using a TIG welding process.

In the post welding step, an arc current value below 1 A cannot provide arc discharge from the electrode, and this leads to unsatisfactory heat treatment which cannot achieve reduction of the temperature reduction rate at a welded portion. When the arc current value is above 10 A, the welded portion may be overheated, melting the heat affected zones. Further, in the post welding step, a rotation speed of the cladding tube below 30 rpm may increase a difference in temperature between the arc-discharged point and the other areas, so that corrosion resistance becomes poor because reduction in temperature in the lower temperature areas is great while the welded portion may re-melt due to the relatively high temperature at the arc-discharged point.

The device for manufacturing a fuel rod according to the present invention, comprises: a welding chamber for enclosing the butt ends of the cladding tube of the fuel rod and the plug to be welded; an arc welder having an electrode for discharging an arc to the butt ends by an arc current; and an arc controller for applying the relatively high arc current in the welding step for welding the butt ends and applying the relatively low arc current after the welding step.

The device of the present invention further comprises a drive motor for rotating the cladding tube and the plug, and a motor controller for switching the rotation speed of the cladding tube and the plug to a relatively low value in the welding step for welding the butt ends and to a relatively high value after the welding step.

Preferably, the arc controller applies the arc current in the range of 1 to 10 A after the welding step. The motor controller sets the rotation speed to above 30 rpm after the welding step. The arc controller applies the relatively low arc current after the welding step so as to set the temperature reduction rate to the range of 70° C./sec. to 5° C./sec. The welder may be a TIG welder.

DETAILED DESCRIPTION OF THE PREFERRED EMBODIMENTS

Figure 1:
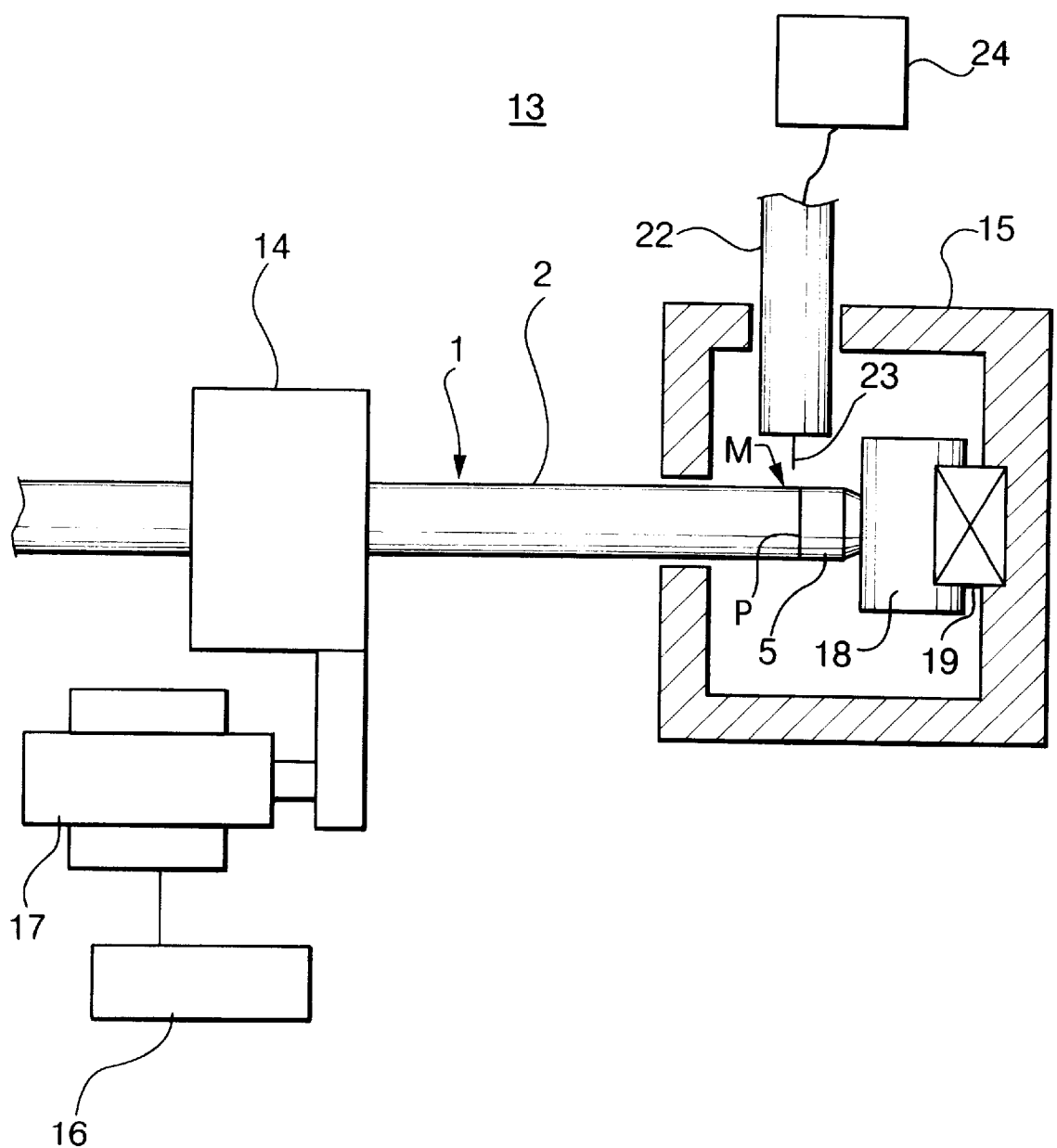
FIG. 1 is a schematic diagram showing a structure of a fuel rod welding device of an embodiment of the present invention.

The best mode of the method for welding a fuel rod, according to an embodiment of the present invention, will be explained with reference to FIG. 1, where the same reference numbers have been employed to designate like parts for the background art, and only the differences are discussed. FIG. 1 represents schematically a fuel rod welding device of the embodiment.

In the fuel rod welding device 13, a cladding tube 2 of a fuel rod 1 is held rotatably by a rotary chuck 14 to rotate about its longitudinal axis, so that one end of the cladding tube 2 sealed with a plug 5 (or 6) is positioned in a welding chamber 15 which has, for example, a box shape.

The rotary chuck 14 is coupled to a drive motor 14 controlled by a rotation speed control unit (motor controller) 16 to enable control of the rotation speed of the cladding tube 2 held by the rotary chuck 14 with the drive motor 14.

The plug 5, which seals the end of the cladding tube 2 positioned inside the welding chamber 15, is held by a stopper (chiller metal) 18, which is supported rotatably by a bearing 19 attached to the inside wall of the welding chamber 15. A gas nozzle 22 of an arc welder is inserted into the welding chamber 15, directing an electrode 23 of the gas nozzle 22 to the butt ends of the cladding tube 2 and the plug 5. The gas nozzle 22 is connected to an arc controller 24 which controls the arc current and arc current supply time.

Preferably, the arc current value ib in the heat treatment step (post welding step) is in a range of 1 A to 10 A, which is lower than the arc current value ia in the welding step. Preferably, the rotation speed Vb of the cladding tube 2 in the heat treatment step is more than 30 rpm, which is higher than the rotation speed Va in the welding step.

In the heat treatment step, an arc current value below 1 A cannot provide arc discharge from the electrode 23, and this leads to unsatisfactory heat treatment which cannot achieve reduction of the temperature reduction rate at a welded portion M. When the arc current value ib is, on the other hand, above 10 A, the welded portion M may be overheated, melting the heat affected zone 8. Further, in the heat treatment step, a rotation speed of the cladding tube 2 below 30 rpm may increase the difference in temperature between the arc-discharged point and the other circumferential areas near the welded portion, so that corrosion resistance becomes poor because the reduction in temperature in the lower temperature areas is great while the welded portion M may re-melt due to the higher temperature at the arc-discharged point.

With the rotary chuck 14 driven by the motor 17, the cladding tube 14 is rotated synchronously with the plug 5 in the welding chamber 14. While rotating the cladding tube 14 and the plug 5, the gas nozzle 22, which is directed to the butt ends P of the cladding tube 2 and the plug 5, receives an arc current whose value ia and supply time ta are adjusted by the arc controller 24, so that the arc discharge is provided from the electrode 23 to the butt ends P in an atmosphere of a shield gas such as helium discharged from the gas nozzle 22.

Thus, the butt ends P of the cladding tube 2 and the plug 5, rotated in a circumferential direction, are welded together successively, forming the heat affected zones 8 on both sides of the bead 7 at the welded portion M.

The control of the arc current i supplied from the controller 24 to the gas nozzle 22 will be explained. In the welding process for the butt ends P, an arc current ia is supplied to the gas nozzle 2 and is applied for a time ta for one cycle of rotation of the butt ends P of the cladding tube 2 and the plug 5 driven at the speed Va. The heating value of the arc discharge is high enough to securely weld the butt ends P.

To avoid occurrence of craters at the welded portion M, the arc current value i is gradually reduced from ia to ib (<ia) to cool the welding portion M, at which point the welding step is completed.

When the arc current value i is set to the holding current value ib, the flow proceeds from the welding step to the heat treatment step, in which the rotation speed V of the drive motor 17 controlled by the motor controller 16 is switched from Va to the relatively high value Vb (>Va) so that the butt ends P are rotated at the high speed Vb. The arc current has been fixed to the holding current value ib for the time tb.

Depending on the arc current ib, the arc discharge from the electrode 23 is smaller than that in the welding step, and the cladding tube 2 and the plug 5 are rotated at the relatively high speed Vb, leveling the temperature around the welded portion M (which includes the bead 7 and the heat affected zone 8, that is, the butt ends P and the periphery thereof). The reduction in temperature at the welded portion M and particularly at the heat affected zone 8 becomes small so that the temperature reduction rate can be adjusted appropriately to the range of 70° C./sec. to 5° C./sec.

By cooling the welded portion M at a temperature reduction rate in the range of 70° C./sec. to 5° C./sec., segregation of Nb and Fe to the grain boundaries in the heat affected zone 8 is enhanced so that the heat affected zone 8 contains 4.0 to 30 weight percent Nb and 0.9 to 20 weight percent Fe in the grain boundaries. In the heat affected zone 8 of the cladding tube 2, occurrence of a white oxide film, which may occur in an autoclave test, can be prevented. Therefore, the corrosion resistance can be improved at the welded portion M which includes the heat affected zone of the cladding tube 2. After the time tb has passed, the supply of the arc current ib is stopped.

According to the embodiment, because the welding step for welding the butt ends P using the gas nozzle 16 and the heat treatment step are performed consecutively, the heat treatment can be stably performed. Further, there is no need to provide an independent heat treatment device, thereby lowering the costs for installation of the device and running costs.

The invention will now be described in greater detail, by way of an example, in which the gas nozzle 22 for the TIG welding step has an electrode 23 with a diameter of 1.0 mm, helium gas is used as the shield gas, and the butt ends P of the cladding tube 2 and the plug 5 as a workpiece have an outside diameter of 9.5 mm.

The arc current ia supplied to the gas nozzle 22 in the welding step is set to 30 A, the arc current supply time ta is 5 seconds, and an arc current decreasing rate for treatment for craters is set to 11 A/sec.

In the heat treatment step, the holding current value ib of the arc discharge is set to 3.5 A, and the holding time tb at the holding current value ib is 3.5 seconds. The rotation speed of the cladding tube 2 and the plug 5 is 18 rpm in the welding step and is 40 rpm in the heat treatment step.

In a comparative example, the same gas nozzle 22 as the above embodiment is used, the arc current value ia is 30 A, the arc current supply time ta is 5 seconds, the arc current decreasing rate for the treatment for craters is 11 A/sec., the welding step is carried out in a manner similar to the embodiment, but the heat treatment step is not performed.

Figure 2A:
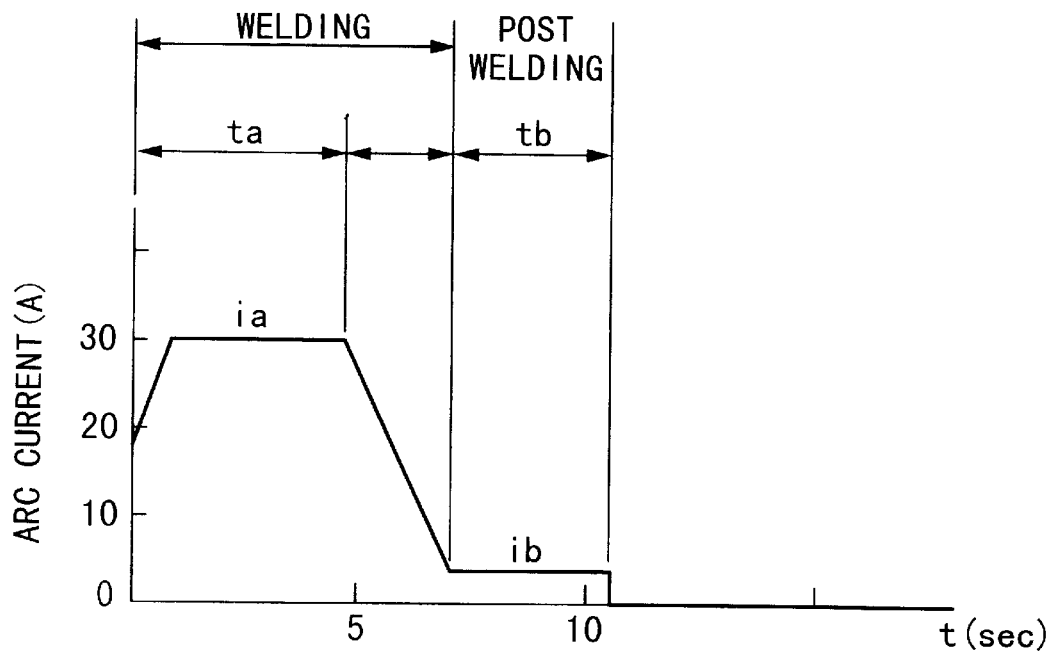
FIGS. 2a and 2b are diagrams showing the relationship between the arc current and the change in temperature at a welded portion in the present invention.
Figure 2B:
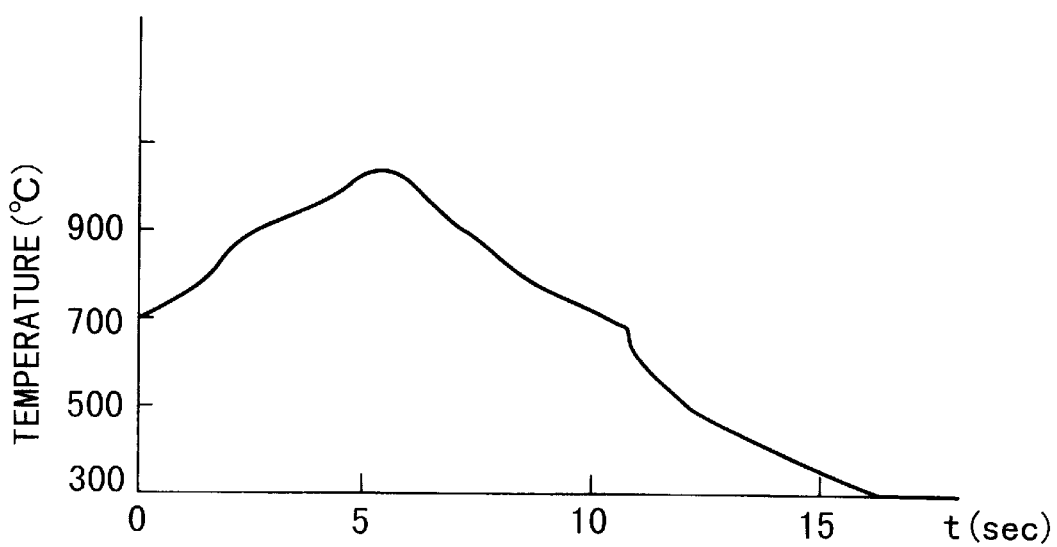

In the embodiment and the comparative example, the butt ends P of the cladding tube 2 and the plug 5 undergo the TIG welding step, and the change in temperature at the welded portion M is measured with respect to the arc current value. FIG. 2b shows the measured change in temperature at the welded portion M with respect to the arc current in the embodiment, and FIG. 3b shows that of the comparative example.

Figure 3A:
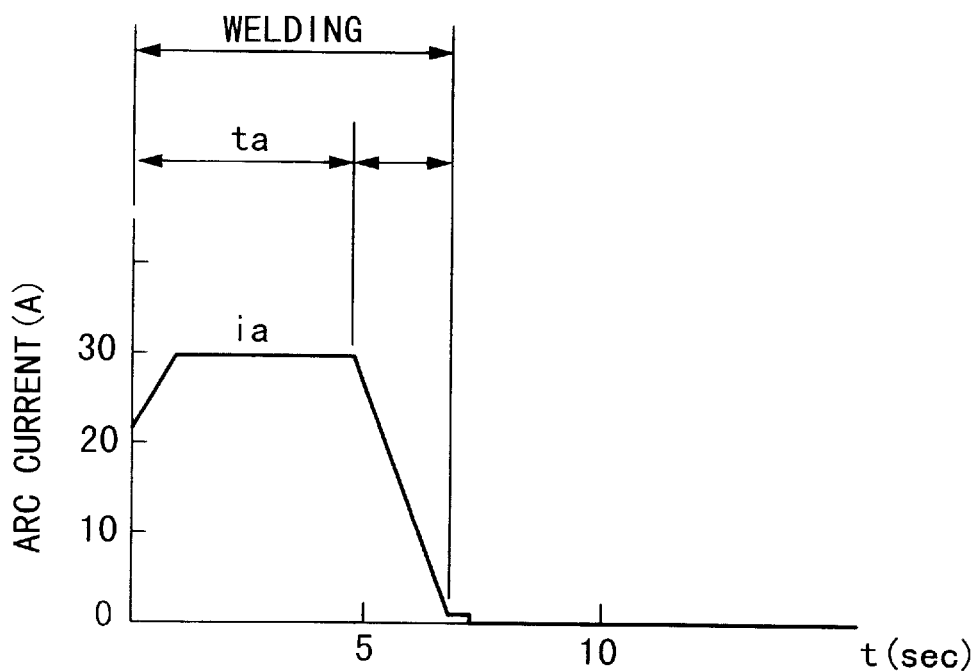
FIGS. 3a and 3b are diagrams showing the relationship between the arc current and the change in temperature at a welded portion in a comparative example.
Figure 3B:
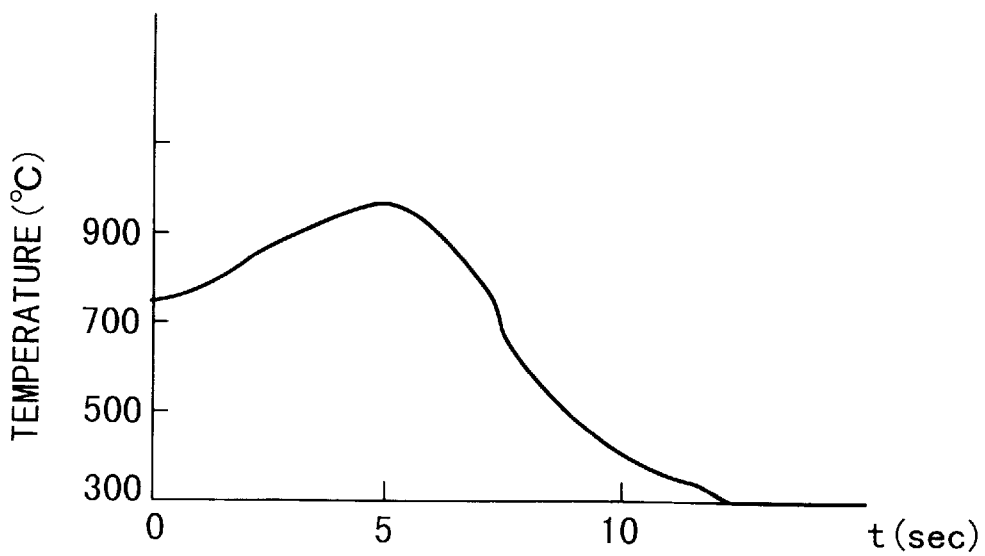
Figure 4:
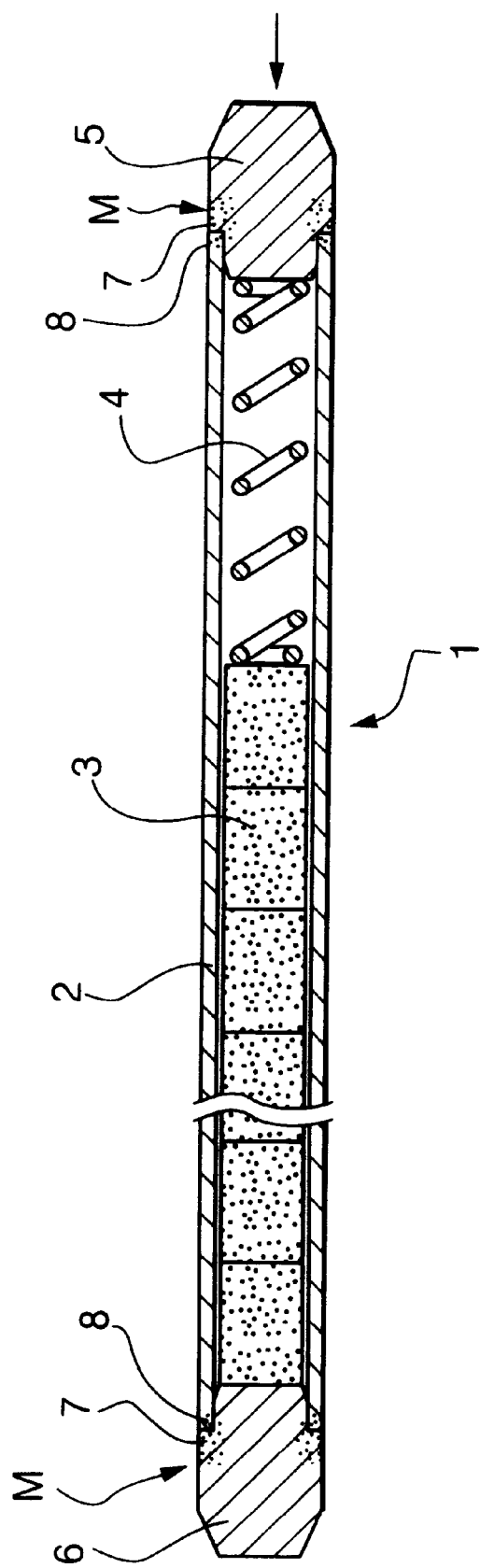
FIG. 4 is a vertical cross sectional view showing the structure of a fuel rod with a cladding tube and a plug.
Figure 5:
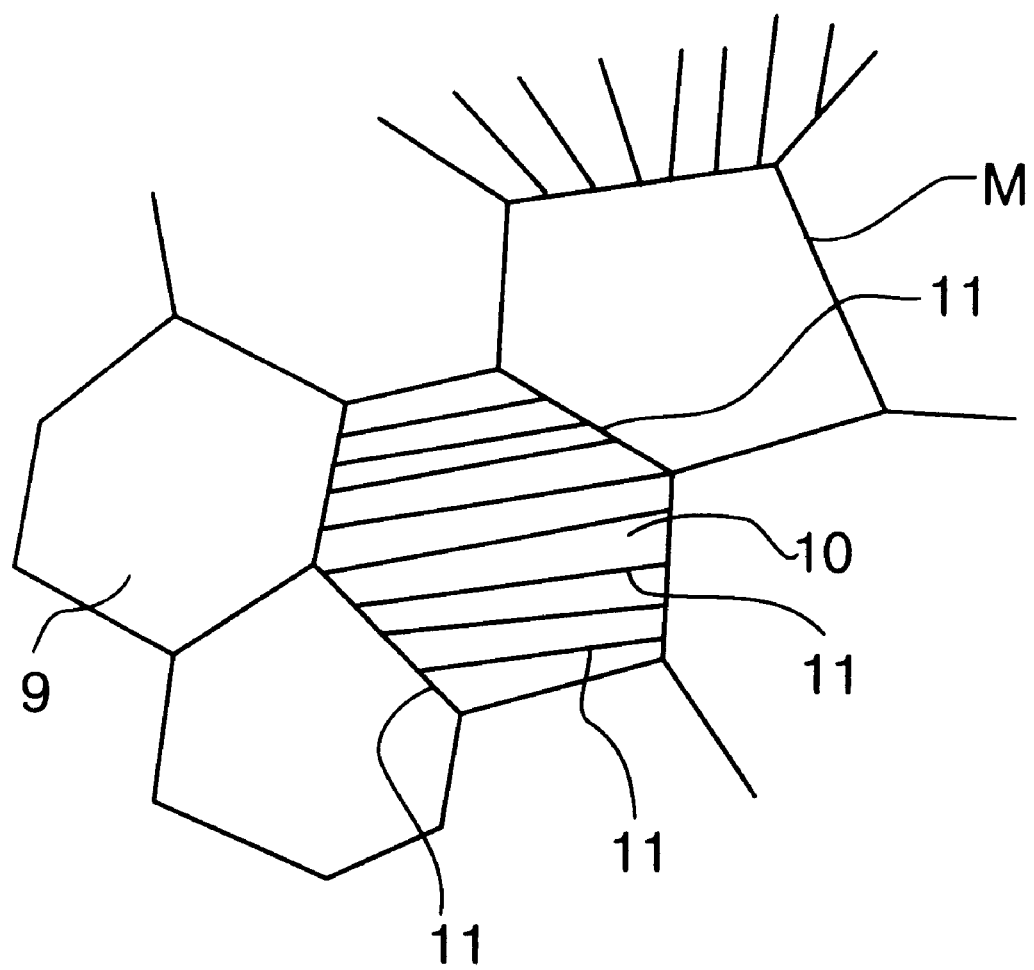
FIG. 5 is a diagram showing the structure of the heat affected zone of a cladding tube of zirconium containing Nb and Fe after TIG welding.

As apparent from FIGS. 2b and 3b, the temperature reduction rate at the welded portion M after the crater treatment is smaller than that in the comparative example. The time required for reduction in temperature to 300° C. at the welded portion M in the embodiment is longer than the comparative example by approximately 3 seconds. The temperature reduction rate in the heat treatment step in the embodiment is 6° C./sec. while the temperature reduction rate after the welding step in the comparative example is approximately 100° C./sec. The results show that the corrosion resistance of the embodiment is improved.

In the embodiment of the present invention, the temperature at the welded portion M in the heat treatment may be measured, and the measured temperature may be fed back to the control unit 24 in the TIG welder, and the arc current ib may be increased or decreased based on the measurement of the temperature to adjust the temperature reduction rate to a desirable value, thus controlling the temperature in the heat treatment step more accurately.

While the arc current value ib in the heat treatment step is fixed in the embodiment, the present invention is not limited to this embodiment, and the arc current value may be optionally controlled so as to adjust the temperature reduction rate at the welded portion M to the range of 70° C./sec. to 5° C./sec.

According to the present invention, by discharging the arc with a relatively low arc current after the welding step, the temperature reduction rate at the welded portion can be appropriately reduced to the range of 70° C./sec. to 5° C./sec. without any independent heater, and corrosion resistance at the welded portion which includes heat affected zones can be improved.

Further, in the post welding step, the cladding tube is rotated at a relatively high speed, making the temperature uniform at the arc-discharged point and the other circumference areas around the welded portion and making the temperature reduction rates uniform throughout the circumference of the welded portion, so that corrosion resistance can be improved.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A method for manufacturing a fuel rod, comprising:
   a welding step of welding a cladding tube of said fuel rod to a plug by arc discharge generated from a first predetermined arc current, the welding step including a reduction step of subsequently reducing the first predetermined arc current to a second predetermined arc current which is lower than the first predetermined arc current; and
   a post welding step of subsequently performing heat treatment by discharging an arc to a welded portion by the second predetermined arc current.

2. A method according to claim 1, wherein, in the welding step and in the post welding step, said cladding tube and said plug are rotated with respect to an electrode for discharging arc.

3. A method according to claim 2, wherein the rotation speed of said cladding tube and said plug in the post welding step is higher than that in the welding step.

4. A method according to claim 2, wherein, in the post welding step, the rotation speed of said cladding tube and said plug is above 30 rpm.

5. A method according to claim 1, wherein, in the post welding step, the second predetermined arc current value is in a range of 1 to 10 A.

6. A method according to claim 1, wherein, in the post welding step, a temperature reduction rate is in a range of 70° C./sec. to 5° C./sec.

7. A method according to claim 1, wherein the welding step is performed using a TIG welding process.

8. A device for manufacturing a fuel rod, comprising:

a welding chamber for enclosing butt ends of a cladding tube of said fuel rod and a plug to be welded;

an arc welder having an electrode for discharging an arc to said butt ends by an arc current; and an arc controller for performing a welding step of welding a cladding tube of said fuel rod to a plug by arc discharge generated from a first predetermined arc current, the welding step including a reduction step of subsequently reducing the first predetermined arc current to a second predetermined arc current which is lower than the first predetermined arc current, and a post welding step of subsequently performing heat treatment by discharging an arc to a welded portion by the second predetermined arc current.

9. A device according to claim 8, further comprising a drive motor for rotating said cladding tube and said plug.

10. A device according to claim 9, further comprising a motor controller for switching a rotation speed of said cladding tube and said plug to a relatively low value in a welding step for welding said butt ends and to a relatively high value after the welding step.

11. A device according to claim 9, wherein said drive motor sets the rotation speed to above 30 rpm after the welding step.

12. A device according to claim 8, wherein said arc controller applies an arc current in a range of 1 to 10 A after the welding step as the second predetermined arc current.

13. A device according to claim 8, wherein said arc controller applies the second predetermined arc current after the welding step so as to set a temperature reduction rate in a range of 70° C./sec. to 5° C./sec.

14. A device according to claim 8, wherein said welder is a TIG welder.

* * * * *